United States Patent [19]

Champa

[11] Patent Number: 5,315,633
[45] Date of Patent: May 24, 1994

[54] DIGITAL VIDEO SWITCH FOR VIDEO TELECONFERENCING

[75] Inventor: John J. Champa, Dearborn, Mich.

[73] Assignee: UNISYS Corporation, Blue Bell, Pa.

[21] Appl. No.: 811,131

[22] Filed: Dec. 20, 1991

[51] Int. Cl.$^5$ .................. H04N 1/42; H04N 7/14; H04M 3/42

[52] U.S. Cl. .................... 348/16; 379/202; 348/15

[58] Field of Search ............ 379/54, 53, 202, 203, 379/204, 205, 206; 358/85; 370/110.1, 112; 375/3

[56] References Cited

U.S. PATENT DOCUMENTS

| | | | |
|---|---|---|---|
| 4,105,973 | 8/1978 | Arnold et al. | 375/3 |
| 4,456,789 | 6/1984 | Groves et al. | 379/202 |
| 4,477,900 | 10/1984 | Gruenberg | 370/112 |
| 4,516,156 | 3/1985 | Fabris et al. | 379/53 |
| 4,645,872 | 2/1987 | Pressman et al. | 379/54 |
| 4,682,349 | 7/1987 | Sorriaux | 379/54 |
| 4,710,917 | 12/1987 | Tompkins et al. | 379/202 |
| 4,730,312 | 3/1988 | Johnson et al. | 370/110.1 |
| 5,003,532 | 3/1991 | Ashida et al. | 358/85 |
| 5,062,136 | 10/1991 | Gattis et al. | 358/85 |

*Primary Examiner*—Curtis Kuntz
*Assistant Examiner*—Jason Chan
*Attorney, Agent, or Firm*—John B. Sowell; Mark T. Starr

[57] ABSTRACT

A digital video switch system comprising a smart control terminal is coupled to a digital access controller and to a multipoint control unit. The smart control terminal is provided with a plurality of function keys, each of which is designed to provide automatic interconnection of input and output ports of the digital access controller and the multipoint control unit so that a predetermined interconnection of video and audio signals from remote conferencing sites are interconnected via input/output ports of the digital access controller with each other in a desired format to provide central teleconferencing control of a plurality of sites from a central control site.

9 Claims, 5 Drawing Sheets

DIGITAL VIDEO SWITCH FOR VIDEO TELECONFERENCING

BACKGROUND OF THE INVENTION

1. Field of the Invention

The present invention relates to business television and video conferencing systems. More particularly, the present invention relates to a programmable digital switch for use in controlling video teleconferencing systems as well as business television systems independently or simultaneously with a single room or studio coordinator/controller.

2. Description of the Prior Art

AT&T as well as MCI and U.S. Sprint now provide services referred to as video teleconferencing. The equipment, systems and cost may differ between vendors to achieve a desired result function wherein two or more groups of conferees at different locations are able to view each other while conducting a real time conference and wherein different types of information are exchanged. Video TeleConferencing (VTC) differs from Business TeleVision (BTV) in that business TV is best described as Receive Only Viewing (ROV) by large audiences at remote locations of a single TV program usually originating at a single source. When business TV is combined with call in telephone questions, etc. from the live audience the results are similar to TV talk shows that take questions via telephone from the viewing audience.

Teleconferencing and business TV do not require as broad an information band as commercial TV. Commercial satellite TV in the United States employs an analog FM format requiring 36 megahertz bandwidth. Using digital data compression techniques it is presently possible to transmit sufficient data for video teleconferencing at a bandwidth of 768 kilobits per second with 384 kilobits per second transmission predicted for the future. The lower transmission rates are accompanied by lower network transmission cost without information degradation.

There are presently four or five major competing transmission network services whose cost are constantly being reduced so that no one dedicated VTC/BTV system is capable of taking advantage of all of the desirable features of any one system over a period of time.

Thus, it would be highly desirable to provide a teleconferencing system which may be used for business television and is flexible enough to accept input from and output to the various competitive networks so that the most efficient and most economical available network can be programmed for use with the present invention system.

SUMMARY OF THE INVENTION

It is the primary object of the present invention to provide a most cost effective interactive video teleconferencing and business television system.

It is a primary object of the present invention to provide a novel digital video switching system for teleconferencing and/or business TV.

It is a primary object of the present invention to provide a novel digital video switching system which will accommodate both analog and digital network signals without the necessity of modifying the switching system.

It is another object of the present invention to provide a teleconferencing system which is adapted to interact with different networks simultaneous.

It is another object of the present invention to provide a video digital switch for a teleconferencing system that controls video teleconferencing and business television simultaneously.

It is a general object of the present invention to provide a novel control system incorporating a novel digital switch for a hybrid video teleconferencing/business TV system.

It is a general object of the present invention to provide a novel digital video switch for use with commercially available network communication lines using a mixture of dedicated and reservation-use digital circuits.

According to these and other objects of the present invention there is provided a video conferencing control system for routing digital video signals from point-to-point or from point-to-multiple points through a novel programmable digital video switch (DVS) having a plurality of input/output ports connectable to remote teleconferencing points or sites. A programmable multipoint voice actuated control unit (MCU) is coupled to the novel digital switch for automatically interconnecting said ports indicative of different sites according to a predetermined program. Smart terminal control means are employed for programming said programmable MCU and DVS and/or changing said predetermined program during actual video teleconferencing.

DESCRIPTION OF THE PREFERRED EMBODIMENTS

Before describing the preferred embodiments in detail, it should be understood that the equipment to be described hereinafter is for the most part commercially available discrete components which have been modified and arranged in a system configuration to be operable and compatible and to achieve the desired result at a minimum cost of the capital equipment and tariff cost of transmission lines and data links. It can be shown that in the present state of art that two way coders/decoders (CODEC) are presently capable of compressing and decompressing video data which in satellite transmission analog form employs 36 megahertz FM bandwidth for satellite uplink into compressed digital data containing approximately 1.5 megabits per second that when decoded and decompressed permits generation of acceptable full motion video pictures for business TV (BTV) use. Similarly the same CODEC incorporated into the preferred embodiment system can be programmed to compress analog converted video information down to 768 kilobits per second in digital format which may be decoded and decompressed to permit generation of acceptable video pictures of the type employed in Video TeleConferencing (VTC). Unisys Corporation has recently recommended 384 kilo bits per second bandwidth for video teleconferencing services using U.S. Sprint dedicated logical T-1 digital line service.

The latest state of the art CODEC equipment will convert analog video signals into 384 Kpbs digital signal capable of being decoded and decompressed into analog data providing thirty full video frames per second. This CODEC equipment is compatible with the CCITT H.261 digital standard which provides 30 frames per second employing 1.544 Mbps. Universal acceptance of this CCITT H.261 digital standard will provide a format that is compatible with commercially available digital communication circuits in the United States and will provide an acceptable and viable alternative to direct FM analog uplink services which employs a 36 Megahertz FM analog bandwidth.

When broadcasting business TV to a large number of sites throughout the world it is often necessary to select satellite uplink and downlink transmission to be able to communicate with the most remote sites. When circumstances demand that a satellite data link system be employed, it is often possible to receive the satellite broadcast in analog format and display the analog signal at the receiver site or to convert the analog signal at or reasonably near the receiver site and employ digital telephone lines to the receiver site.

Figure 1:
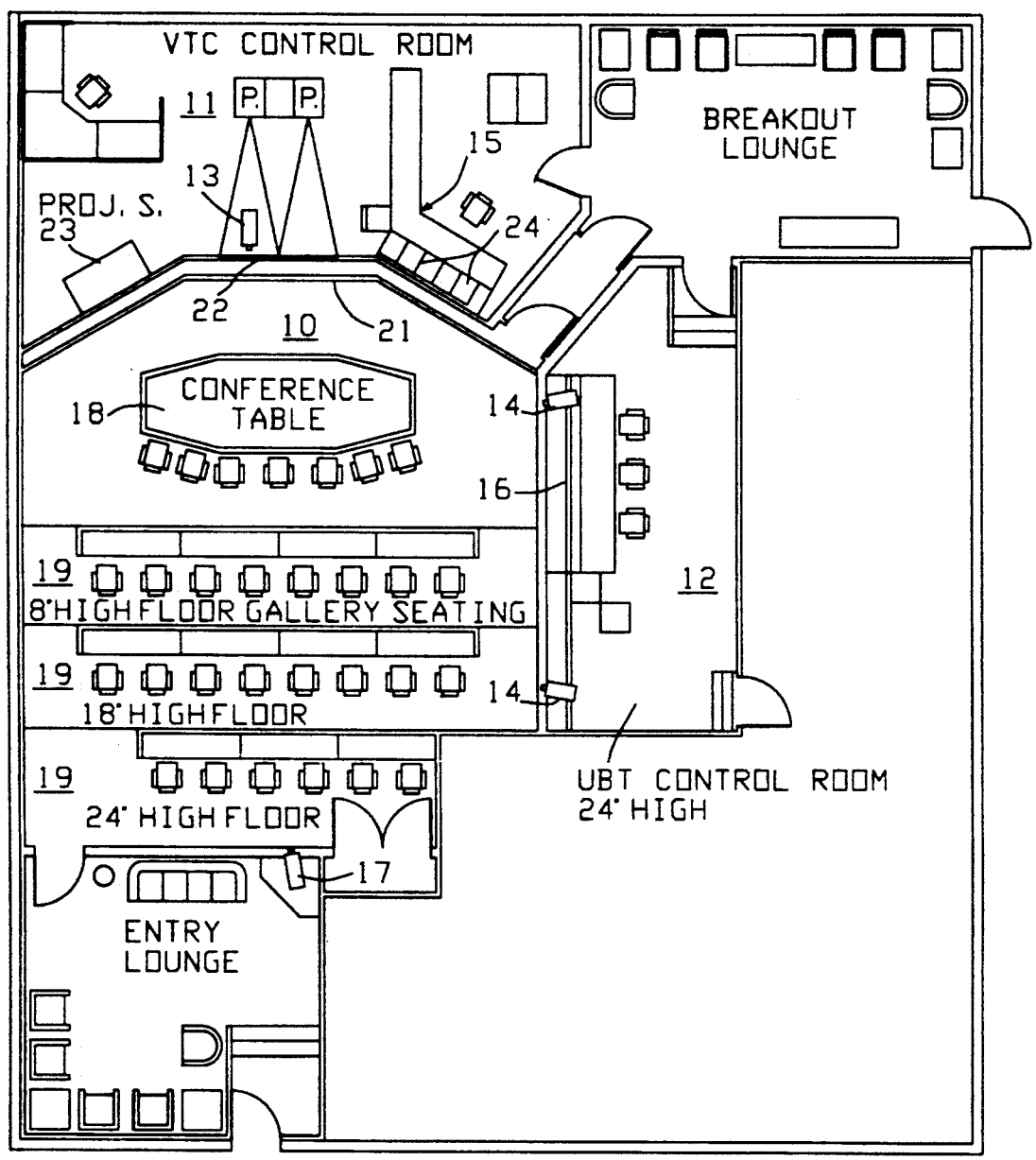
FIG. 1 is a plan view of a preferred embodiment dual purpose studio/video teleconferencing room.

Refer now to FIG. 1 showing a plan view of a preferred embodiment dual purpose studio/video teleconferencing (VTC) facility 10 having a VTC control room 11 designed and adapted to be operated by a room coordinator. When the facility 10 is to be employed for business TV (BTV), the BTV control room 12 is designed and adapted to be operated by the room coordinator. Prior to VTC meetings and BTV broadcast the facility 10, control room 11 and/or room 12 are set up by positioning front TV camera 13, side TV camera 14, movably mounted on track 16, and rear TV camera 17 for start of broadcast positions. People seated at conference table 18 or in the elevated gallery seating 19 have a clear view of the right side monitor 21, left side monitor 22 and large projection screen 23, usually used for business broadcast, but may be used together with monitors 21 and 22 when desired. Either the control room may be set up and/or reconfigured while the other control room is on line.

The three cameras 13, 14 and 17 are all mounted on high speed pan/tilt heads and are pre-programmable for up to 48 discrete preset camera positions which are accessed and controlled by keyboard controls to be described hereinafter at control station 15 shown having a plurality of monitors 24 provided for displaying different possible inputs to the conference room. The left side or receiver monitor 22 preferably displays the conference or the graphics copy or the video tape being transmitted from one or more active sites of a plurality of sites participating in a teleconference. The right side monitor 21 preferably displays the same information as above which originates at facility 10, thus informing the on-site conferees with the television picture and sound of the transmitted picture and sound. The receiver monitor may be controlled by the room coordinator or switched from site to site by voice activation as will be explained hereinafter.

Figure 2:
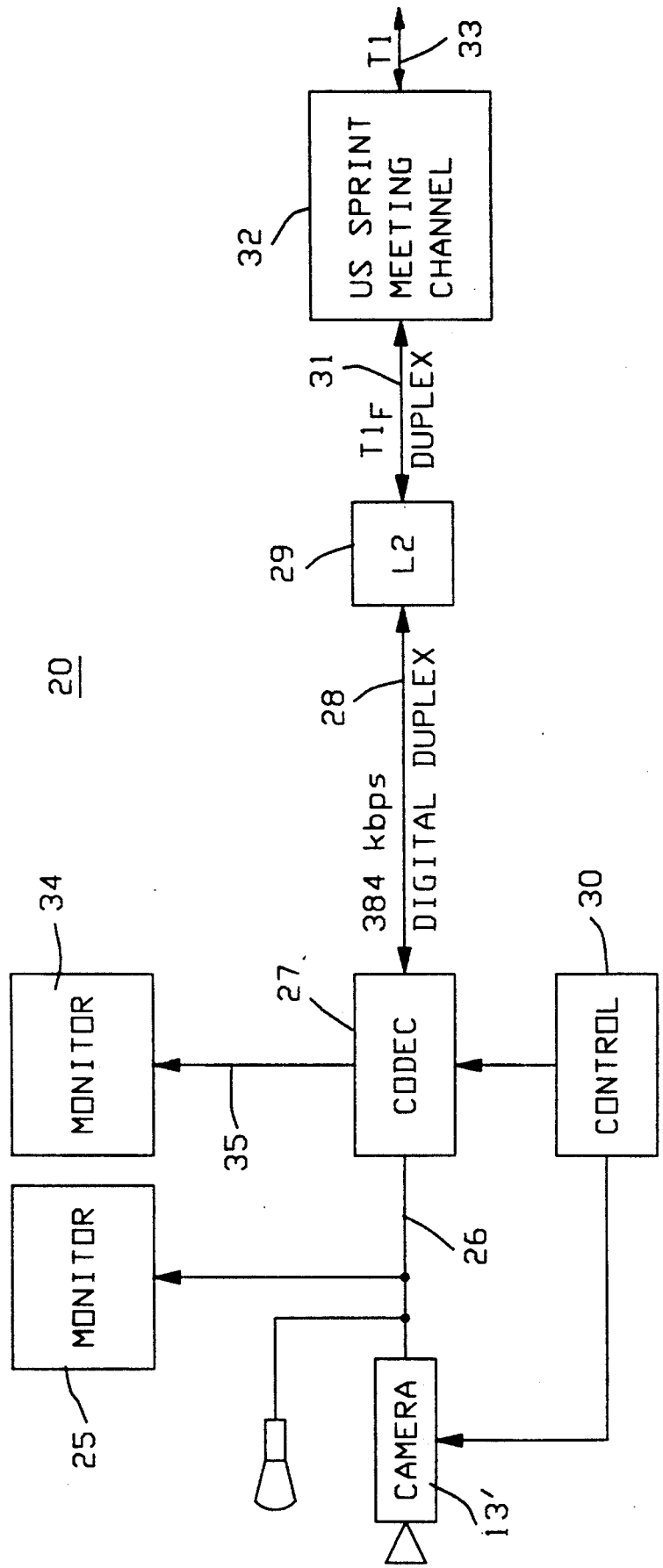
FIG. 2 is a schematic diagram of the minimum equipment recommended for two way teleconferencing at a remote domestic site accessible by T-1 digital access lines.

Refer now to FIG. 2 schematically showing a minimum site configuration 20 for TV conferencing participation by a group of conferees. A single TV camera 13 is directed to display on monitor 25 the analog generated output on line 26. The analog information on line 26 is applied to the input side of coder/decoder 27 by control 30 which is programmed to produce a preferred digital output having at least a 384 Kpbs data rate capable of defining thirty frames of information per second on line 28. The digital information on digital duplex line 28 is applied to Unisys/Timeplex Link/2 (TM) exchange 29 which stuffs or fills the bandwidth to produce a full T-1 bandwidth with information having 1.5 megabits per second on dedicated terrestrial telephone line 31. Line 31 may be a fraction T-1 ($T\text{-}1_F$) duplex line when such $T\text{-}1_F$ lines are available and capable of transmitting the digital video, data and voice requirements of the site. Dedicated line 31 is connected to an interexchange point of presence (POP) 32 provided by a carrier such as U.S. Sprint. The carrier interconnect line 33 is shown as a full T-1 bandwidth line for purposes of illustration only but could be a fractional line $T\text{-}1_F$ as explained above. At the time of this application, Sprint half T-1 meeting channel lines ($T\text{-}1_F$) could be obtained on short notice for coast to coast transmission for approximately $225.00 per hour. The same service using a Virtual Private Network line was available for approximately $60.00 per hour, thus providing teleconferencing users with one of the lowest cost means of network communication. Like common voice telephone lines, T-1 digital lines are bi-directional and digital voice and video data received at site 20 via line 33 is applied to decoder (CODEC) 27 where it is decoded into analog signals for display on right side monitor 34 via line 35.

Figure 3:
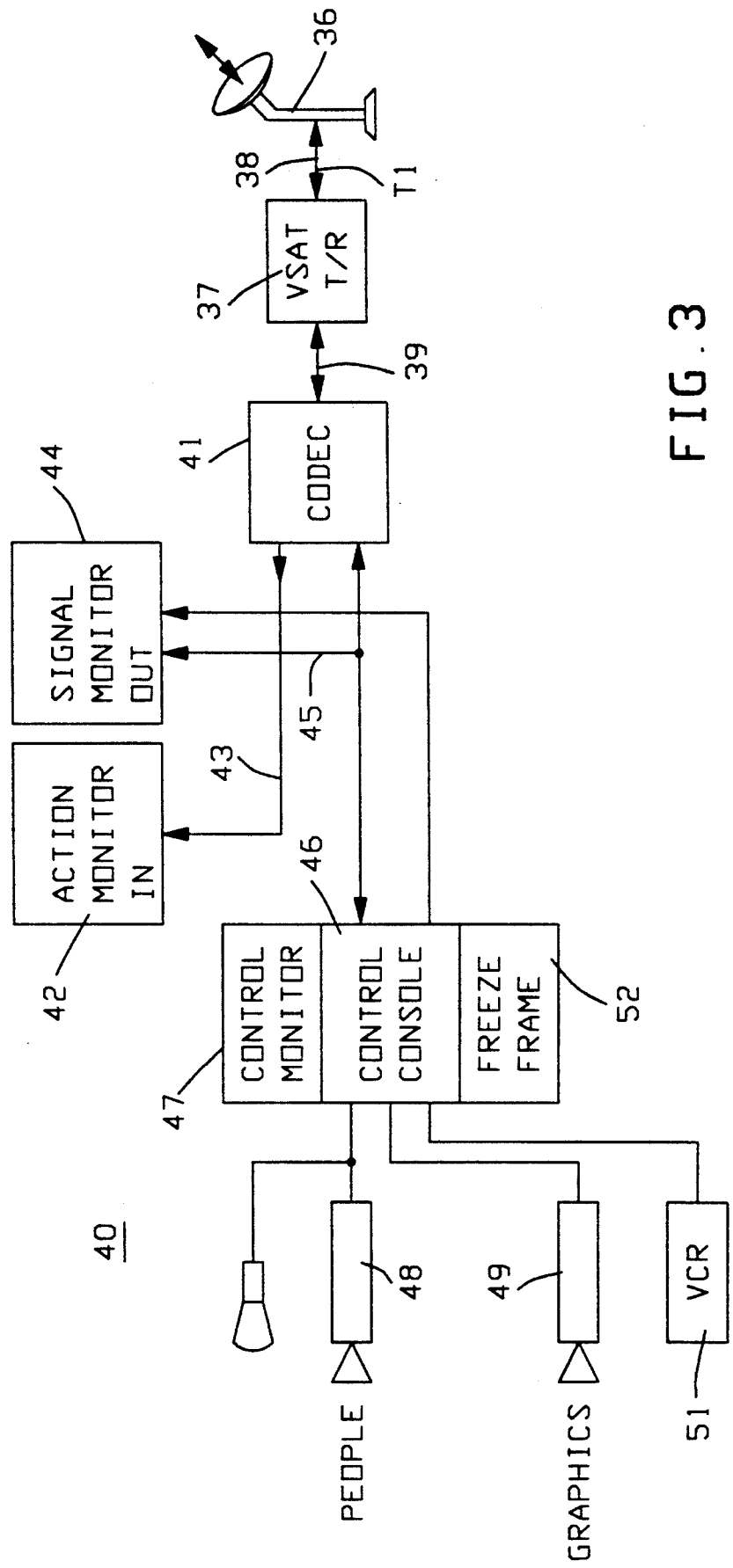
FIG. 3 is a schematic diagram of the preferred equipment recommended for complete two way teleconferencing showing a site which is not accessible to low cost T-1 digital access lines.

Refer now to FIG. 3 showing a schematic diagram of a preferred embodiment site 40 connected by a Video Satellite disk 36 which is preferably transmitting and receiving digital data compatible with the aforementioned T-1 digital lines. Hughes Network Systems installs such video satellite equipment (VSATS) 37 which is connected via full or fractional $T\text{-}1_F$ analog lines 38 to 2.4 meter Ku- band satellite antennas 36 for transmission to and reception from Hughes owned Satellite Business Systems, Inc. (SBS) satellites (not shown). Other satellite network services, such as AT&T Sky Net Satellite Services, are available and could be substituted for elements 36 to 38 and could be provided with a compatible and proper signal on line 39 from CODEC 41. In the preferred embodiment of the present invention the signals on line 39 are digital and compatible with CCITT H.261 digital standard format as well as full or fractional T-1 network line employing 1.544 Mbps for a full T-1 line. Digital systems reduce the cost of conversion equipment when standardized and are preferred.

Commercially available CODEC equipment may be purchased with a plurality of digital conversion options, however, a prior art CODEC equipment is not selectably switchable to a plurality of fractional T-1 bandwidths and/or analog frequencies for compatibility with different manufacturers equipment.

The VSAT disk 37 is capable of transmitting digital or analog signals to an SBS satellite having a bandwidth capable of supporting a large number of T-1 digital channels. Recent developments in digital transmission techniques have more than doubled the number of T-1 channel supported by one satellite transducer channel, thus, the trend and the preferred embodiment shown in FIG. 3 is preferably fully digital, but is adapted to operated in a hybrid analog mode in remote areas where full digital mode is commercially uneconomical or virtually unobtainable.

The digital side of CODEC 41 on line 39 may be 384 Kbps or 768 Kbps with the trend toward lower frequencies as better data compression techniques become available. The analog side of CODEC 41 is connected to the left side receiver monitor 42 via line 43 for displaying the received video signal. The right side monitor 44 is connected to transmit line 45 under control of control console 46 which is provided with a plurality of control monitors 47, one for each source of video information. One of the two video cameras 48 shown is directed toward the conferees and the people in the gallery. A graphics display video camera 49 is mounted vertically at the control console 46 to permit a room coordinator/operator to display indicia such as text, slides, computer graphics, charts, etc. In addition, to the graphic camera 49, a video tape player/recorder 51 is provided at the preferred embodiment site 40. The control console 46 is preferably provided with a high speed full frame grabber (or freeze control) 52 for holding, recording on transmitting selected full frames of video information from any of the aforementioned analog sources. Thus, a frame of video information available at console 46 may be loaded in CODEC 41 and transmitted on the video channel as a frame of 256,000 bits while the operator is changing the graphics displayed on one of the console monitors prior to subsequent transmission.

Figure 4:
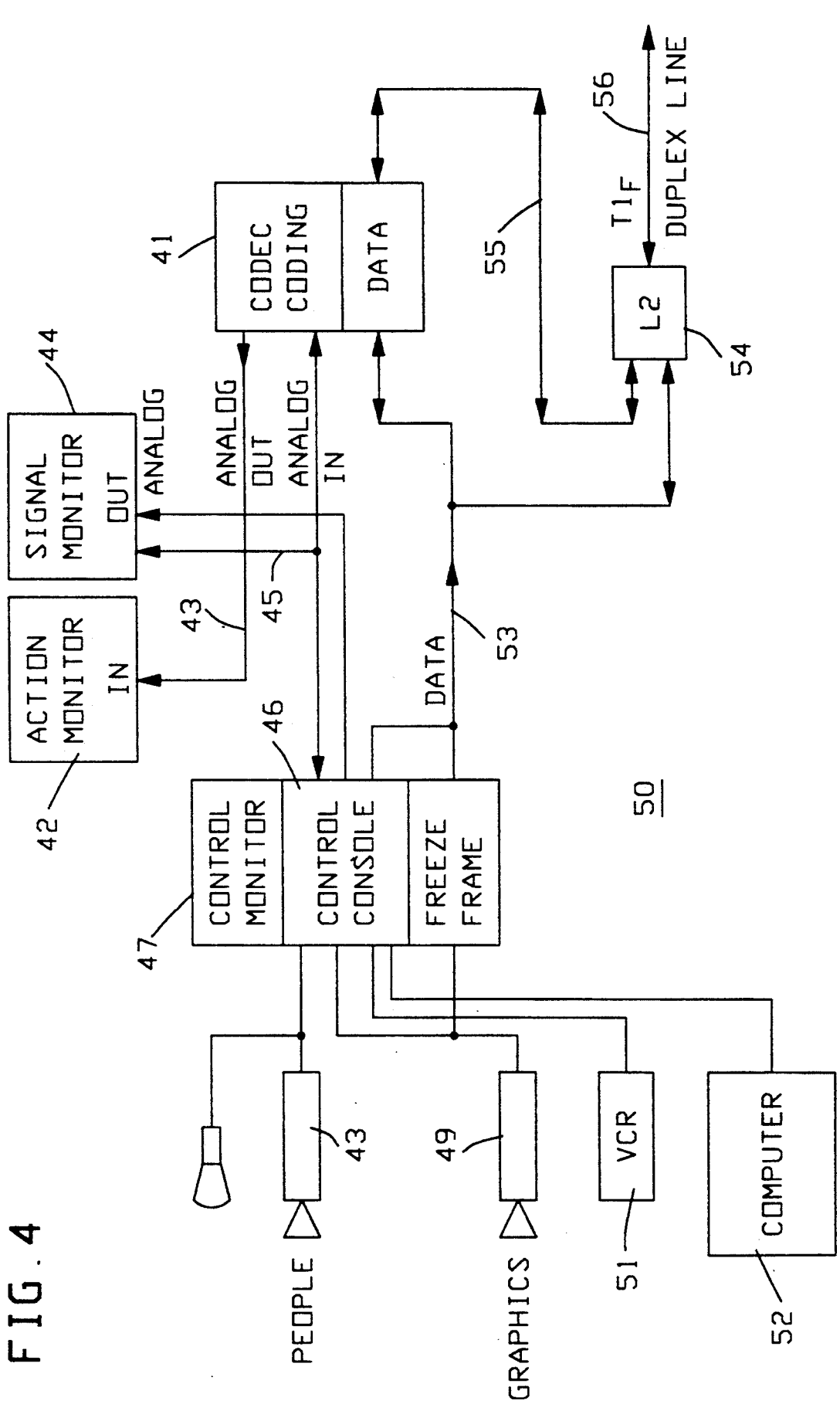
FIG. 4 is a schematic diagram of the preferred equipment recommended for complete two way telecommunication showing a site which is accessible to low cost T-1 digital access lines.

Refer now to FIG. 4 showing a schematic drawing of a preferred teleconferencing site 50 having all of the same facilities and on-site equipment as shown in FIG. 3. In addition computer 52 may be coupled through control console 46 having data output line 53 coupled directly to a Timeplex digital mini link 54 which is capable of managing both digital video on line 55 and/or generating loss less compressed data on duplex line 55 for transmission to the central studio/control via fractional T-1$_F$ line 56. When T-1$_F$ line 56 is not fully utilized with video or data information the mini link 54 stuffs bits during transmission and removes bits during reception automatically. The numbers of elements and components which are the same as those used in site 40 and FIG. 3 are numbered the same as in FIG. 4 and do not require additional explanation for this full digital transmission/reception site.

In the preferred mode of operation the graphics camera 49 or the computer 52 may generate a frame of data to be transmitted to the other sites. The most economical way to transmit this frame of data is to provide a graphics card in the CODEC 41. Such cards are available from Compression Labs, Inc. for use with Rembrandt video CODECs. The frame of data may be stored in the CODEC data portion as one megabit of digital data. The video picture is interrupted for less than one second and the uncompressed digital data frame is transmitted to a CODEC at the receiving end having a similar graphics card capable of storing the transmitted frame of data. The frame of data is then available at the output of the receiving CODEC under the control of the room coordinator at the receiving end as will be explained hereinafter.

The compressed video data on line 55 may be presented as the transmitted signal or the freeze frame data may be presented as the transmitted signal to the receiver. When a Timeplex link (L2) is inserted into the circuit as element 54, it can be used to manage the transmission of other forms of data that can be received and routed to a data center. Thus, data on line 53 could use a fractional T-1$_F$ line or the video line 56 when not in active use.

Figure 5:
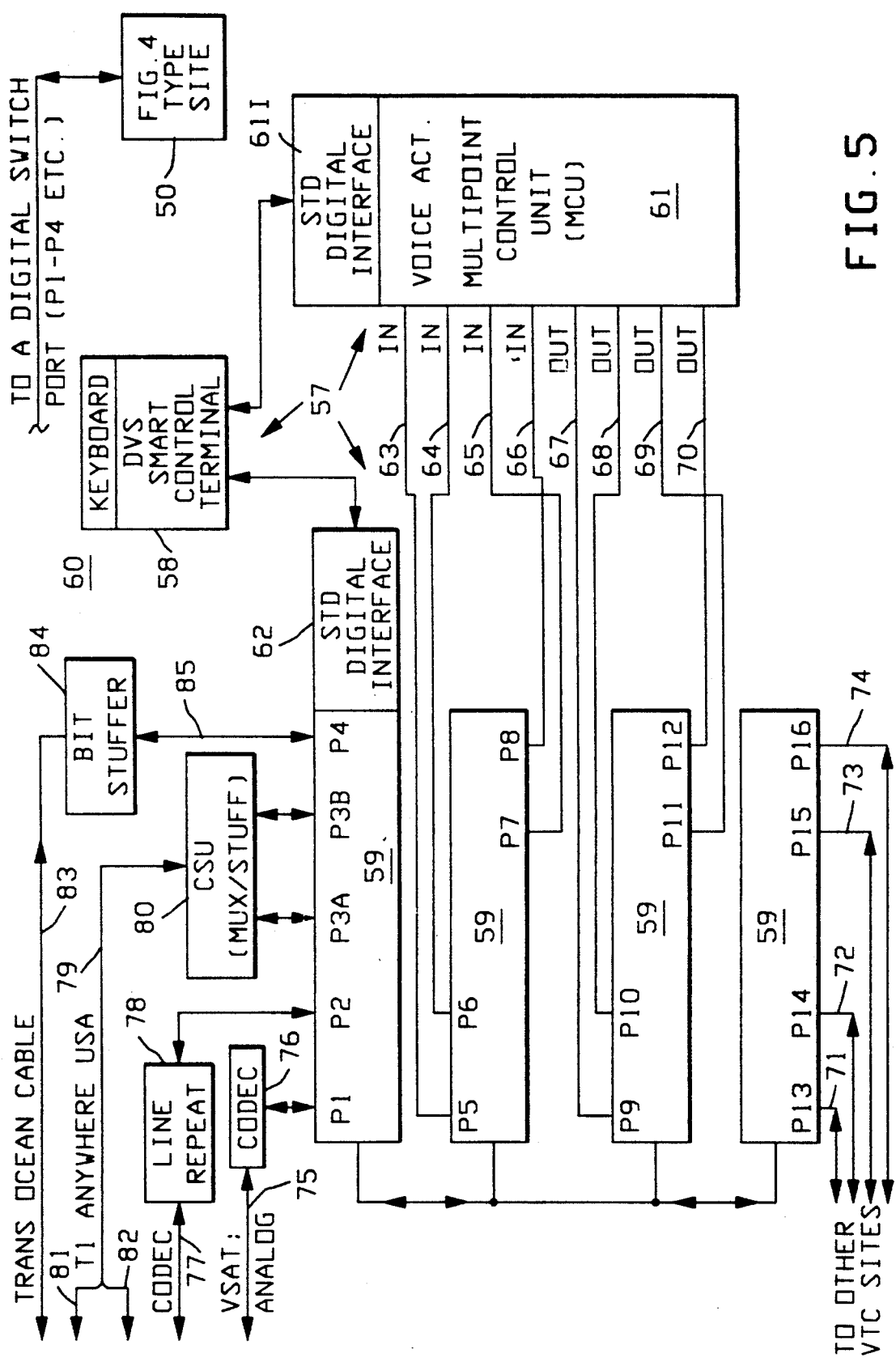
FIG. 5 is a schematic diagram of the preferred embodiment digital video switch for controlling and interconnecting video information from a plurality of sites with each other and controlling a plurality of conferences simultaneously.

Refer now to FIG. 5 showing a schematic diagram of the central control site hub 60 which comprises a FIG. 4 type site 50 and the preferred embodiment digital video switch (DVS) 57. The DVS comprises three main elements including a smart control terminal 58, a plurality of port interchange switches 59 and a multipoint (channel) control unit (MCU) 61.

The preferred embodiment smart terminal 58 around which other components were designed is a C-88GX central processor manufactured by Video Teleconferencing Systems, Inc. (VSI) and this processor actively controls peripheral audio, video and subsystem control devices using single keystroke of function keys on a special keyboard operable by a single coordinator/operator.

The system 57 and DVS terminal 58 enables the operator to control the inputs and outputs connected to a multichannel control unit (MCU) 61. MCU 61 was designed to be controlled by a dumb terminal (not shown) which is preferably removed, but could be bypassed. MCU 61 was modified for the present invention application to provide remote programming and remote control via smart terminal 58 which is coupled to MCU control terminal 61 via a standard interface 61 I.

A plurality of Phoenix Model 1505 small digital access controls (Micro DAC's) 59 are chained together to provide sixteen T-1 digital ports P1 to P16 that were designed to be controlled by a dumb terminal (not shown) which is preferably removed, but could be bypassed. Micro DAC 59 was modified for the present invention application to provide remote programming and remote control via smart terminal 58 which is coupled to Micro Dac 59 via a standard interface 62. The present invention will be explained using sixteen DAC input/output ports and a Compression Labs, Inc MCU 61. Such multipoint control units are available from several manufacturers. The MCU 61 and the CODEC's employed at the the remote sites, (used in the preferred embodiment) and shown in FIG. 5 have been modified to be voice actuated and to select one of the video signals on one of the lines 63 to 66 and to couple it to any or all of the output lines 67 to 70. It will be recognized that the output on lines 67 to 70 are input to ports P9 to P12 of the port interconnection means 59 and that these ports P9 to P12 may be connected to any one of the output ports P13 to P16 which are coupled to video conferencing sites via lines 71 to 74 or back through the bidirectional input lines.

The various input elements to Micro-DAC 59 are all adapted to produce standard 1.5 Megabit per sec. data in T-1 format. FIG. 5 is designed to show the input of different forms of data. The video data on line 75 is illustrated as being in analog format and could originate from a camera, a monitor input or a video satellite dish. CODEC 76 converts the analog information to a preferred 1.5 Mbps format and if the digital output to port P1 is in a fractional T-1$_F$ format a Phoenix Model 1564 fractional multiplexer bit stuffer (not shown) is employed to produce a proper T-1 format input to DAC 59.

Line 77 is illustrated as being in digital T-1 format and could originate from a nearby conferencing site as the output of the remote site CODECSs. When the distance to such nearly sites exceeds approximately 1500 feet, Phoenix Model 1544 line repeaters (amplifiers) 78 are installed to boost the signal input to DAC 59 at port P2.

Line 79 is illustrated as being a T-1 line from anywhere in the USA. However, T-1 fiber optic cable and data links now reach most of North America and parts of Europe. As an example fractional T-1$_F$ lines 81 and 82 could comprise T-1 line 79 coupled to a Sprint Channel Server Unit (CSU) 80 which serves as an interface adapter into port P3. Lines 81, 82 are shown as separate lines to illustrate that line 79 may muxed in CSU 80 and the two fractional T-1$_F$ lines of video data signal separated and recovered. Since DAC 59 is formatted for T-1 input the digital video data at port P3 is muxed and bit stuffed at CSU 80 to produce two distinct signal shown as being produced at two ports P3A and P3B each of which when stuffed to a T-1 format is separately connectable to an output port such as port P5. The two lines 81 and 82 could just as well be connected to a major site in England and a domestic USA site with the same result.

Line 83 illustrates a fractional T-1$_F$ dedicated lease line coupled to a fiber optic cable. The signal on line 83 is bit stuffed to provide a full T-1 format at a site bit suffer 84 before being transmitted to micro DAC 59 via T-1 line 85.

Having explained a preferred embodiment of the present invention it should be understood that the control hub 60 is designed to accept different types of digital video information and relay or transmit the received information to a plurality of remote sites. When used in the teleconferencing mode it is preferred to have available the equipment shown in FIGS. 2 to 4, however, the digital video switch 58 can make connection to rollabout systems of the type sold by Vidicom-Picture Tel, Oki America, Inc. and Mitsubishi Electronics America, Inc. When such integrated type systems are to be employed it is preferred to use a CLI or compatible CODEC system modified to generate the aforementioned voice activation signals for use with the programmable voice activated MCU 61 so that the whole system is two way compatible. When the remote site is used only for business conferencing in a receive only mode it is not necessary to modify the CODEC receiver which acts as a one way digital to analog converter.

The novel digital video switch shown in FIG. 5 may be used for business broadcast of TV presentation using the site 50 connected to micro DAC 59, however, it will be understood that in the teleconferencing mode there will always be video and/or data transmitted from a teleconferencing site as well as the active local video on one of the local monitors in addition to the received video teleconferencing signal from the central site or one of the local sites.

The same transmitting/receiving equipment shown in the FIG. 2 to 4 remote sites is used at the central hub site 60 shown in FIG. 5 to convert transmitted signals to a format convertible to T-1 format for use in the digital video switch 57. The system is adapted for use with any video signal that can be converted to a digital T-1 format.

It will now be understood that smart terminal 58 may be pre-programmed for various conditions so as to connect any input line 63 to 66 to any or all of the output lines 67 to 70 to set up a predetermined teleconferencing interconnection.

Since the outgoing video signal is to be transmitted to all teleconferencing sites being interconnected it is possible to select all predetermined sites and select one of the sites received video signal as the transmitted signal. Further it is possible to employ a voice activated signal generated at the CODEC of any teleconferencing site and use that signal on input lines 63 to 66 to automatically select the video signal for transmittal to all sites. When voice activation is employed, the switching may be prioritized by source or delayed to avoid rapid switching or even manually overridden while observing the incoming signals on the control console monitors 47.

What is claimed is:

1. A programmable digital video switch for controlling video teleconferencing comprising;
    a plurality of conferencing sites,
    each of said sites having a plurality of video monitors,
        at lest one monitor for active on-site monitoring and at least one monitor for displaying a video signal generated at a remote side,
    each of said conferencing sites having at least one video camera for generating on-site video and audio camera signals,
    Compression/Decompression (CODEC) means coupled to said at least one video camera for converting said on-site video and audio camera signals to a predetermined compressed digital format for transmission to a central control site and for decompressing the digital format video and audio camera signals received at said central control site,
    digital transmission/receiving means coupled to said CODEC means for transmitting and receiving the predetermined compressed digital format audio and video camera signals to and from said central control site, and
    digital video switch means located at said control central site comprising:
    digital port interconnection means having a plurality of duplex input/output ports for connecting to said transmission/receiving means coupled to said CODEC means from each of said conferencing sites,
    said digital port interconnection means further having a plurality of output only ports and a plurality of input only ports,
    multiport control means for connecting the input only ports to a plurality of said output only ports, and
    smart terminal control means coupled to said multiport control means for automatically selecting one of said plurality of input only ports and for connecting the selected port to a plurality of said output only ports in response to a predetermined condition remotely programmable at said smart terminal, whereby a combined digital video and audio signal generated at the remote site is selected as an input to said multiport control means and is further selected as a digital output to said plurality of conferencing sites.

2. A programmable digital video switch as set forth in claim 1 wherein said remotely programmable predetermined condition is selectable from a plurality of function keys on a keyboard of said smart terminal.

3. A programmable digital switch as set forth in claim 1 wherein said smart terminal control means is coupled to said multiport control means through a first standard digital interface.

4. A programmable digital switch as set forth in claim 1 which further includes a second standard digital interface connected between said digital port interconnection means and said smart terminal control means.

5. A programmable digital switch as set forth in claim 3 wherein said first standard digital interface is coupled to said port interconnection means for selecting said plurality of output and corresponding input ports for interconnection.

6. A programmable digital switch as set forth in claim 1 wherein all said input and output ports are formatted to be compatible with a digital T-1 format input.

7. A programmable digital switch as set forth in claim 6 wherein at least one of said digital ports further comprises a multiplexer at the input/output port for dividing a digital T-1 input line into a plurality of fractional $T-1_F$ lines.

8. A programmable digital switch as set forth in claim 1 wherein there is provided a plurality of different video format signals from said conferencing sites to be connected to said port interconnection means in digital T-1 format, and at least one of said input ports is provided with a CODEC connected in series with said video format signal for converting said video format signal from analog to digital format.

9. A programmable digital switch as set forth in claim 8 wherein at least one of said input ports is provided with a channel serving unit connected in series with a plurality of video format signals for converting fractional T-1 format signals to full T-1 format signals.

* * * * *